(12) United States Patent
Iyengar et al.

(10) Patent No.: US 11,074,491 B2
(45) Date of Patent: Jul. 27, 2021

(54) EMOTIONALLY INTELLIGENT COMPANION DEVICE

(71) Applicant: RN Chidakashi Technologies Pvt Ltd., Mumbai (IN)

(72) Inventors: Prashant Iyengar, Mumbai (IN); Sneh Rajkumar Vaswani, Mumbai (IN); Chintan Raikar, Mumbai (IN)

(*) Notice: Subject to any disclaimer, the term of this patent is extended or adjusted under 35 U.S.C. 154(b) by 91 days.

(21) Appl. No.: 16/343,739

(22) PCT Filed: May 30, 2017

(86) PCT No.: PCT/IN2017/050210
§ 371 (c)(1),
(2) Date: Apr. 19, 2019

(87) PCT Pub. No.: WO2018/073832
PCT Pub. Date: Apr. 26, 2018

(65) Prior Publication Data
US 2019/0283257 A1 Sep. 19, 2019

(30) Foreign Application Priority Data

Oct. 20, 2016 (IN) .............................. 201621035955

(51) Int. Cl.
*B25J 11/00* (2006.01)
*G06N 3/00* (2006.01)
(Continued)

(52) U.S. Cl.
CPC ............ *G06N 3/006* (2013.01); *B25J 11/001* (2013.01); *G06F 3/167* (2013.01); *G06N 3/008* (2013.01); *G06N 5/022* (2013.01); *G06N 20/00* (2019.01)

(58) Field of Classification Search
CPC ........ G06N 3/006; G06N 3/008; G06N 5/022; G06F 3/167; B25J 11/001
(Continued)

(56) References Cited

U.S. PATENT DOCUMENTS 8,442,832 B2 * 5/2013 Jung ....................... G10L 17/26
704/270
9,002,768 B2 * 4/2015 Fedorov ................... G06N 5/02
706/46
(Continued)

OTHER PUBLICATIONS

Steunebrink, B. R., Vergunst, N. L., Mol, C. P., Dignum, F., Dastani, M., & Meyer, J. J. C. (May 2008). A Generic Architecture for a Companion Robot. In ICINCO-RA (2) (pp. 315-321).*

*Primary Examiner* — Edwin S Leland, III

(57) ABSTRACT

A robotic companion device (10) configured for capturing and analysing affective information and semantic information and elicit response accordingly is disclosed herein. It comprises a processor (20) for managing emotional processing and responses configured for capturing and analysing semantic and affective information from sensory devices and communicating with users as well as external world using multitude of actuators and communication devices; a facial arrangement (11) configured for capturing visual information and displaying emotions; a locomotor arrangement (13) enabling movement of the robotic companion device; and microphone/speaker arrangement (15) configured for receiving auditory signal and emitting vocal response. The facial arrangement (11), the locomotor arrangement (13) and the microphone/speaker arrangement (15) are all in communication with the processor (20).

14 Claims, 4 Drawing Sheets

(51) Int. Cl.
*G10L 13/04* (2013.01)
*G10L 15/26* (2006.01)
*G06F 3/16* (2006.01)
*G06N 5/02* (2006.01)
*G06N 20/00* (2019.01)

(58) Field of Classification Search
USPC .......................................................... 704/272
See application file for complete search history.

(56) References Cited

U.S. PATENT DOCUMENTS

| | | | | |
|---|---|---|---|---|
| 10,410,125 | B1* | 9/2019 | Finkelstein | G06F 16/35 |
| 10,534,900 | B2* | 1/2020 | Cheong | G06F 1/163 |
| 10,691,197 | B2* | 6/2020 | Yoneda | G06Q 30/0269 |
| 2008/0235582 | A1* | 9/2008 | Zalewski | A63F 13/31 |
| | | | | 715/716 |
| 2009/0177607 | A1* | 7/2009 | Matsushima | H04L 67/2842 |
| | | | | 706/46 |
| 2009/0319459 | A1* | 12/2009 | Breazeal | G06N 3/004 |
| | | | | 706/46 |
| 2010/0205129 | A1* | 8/2010 | Aaron | G06Q 30/02 |
| | | | | 706/14 |
| 2014/0025620 | A1* | 1/2014 | Greenzeiger | G06Q 30/02 |
| | | | | 706/47 |
| 2014/0125678 | A1* | 5/2014 | Wang | A63F 13/80 |
| | | | | 345/473 |
| 2014/0277735 | A1* | 9/2014 | Breazeal | H04N 5/23206 |
| | | | | 700/259 |
| 2016/0063874 | A1* | 3/2016 | Czerwinski | G06Q 10/107 |
| | | | | 434/236 |
| 2016/0078369 | A1* | 3/2016 | Frank | G06F 3/013 |
| | | | | 706/12 |
| 2016/0170996 | A1* | 6/2016 | Frank | G06F 16/24578 |
| | | | | 707/748 |
| 2016/0180722 | A1* | 6/2016 | Yehezkel | G09B 5/00 |
| | | | | 434/236 |
| 2016/0199977 | A1* | 7/2016 | Breazeal | B25J 9/1694 |
| | | | | 700/246 |
| 2016/0302711 | A1* | 10/2016 | Frank | A61B 5/746 |
| 2017/0100067 | A1* | 4/2017 | Liu | A61B 5/165 |
| 2017/0214962 | A1* | 7/2017 | Ono | H04N 21/4532 |
| 2017/0337476 | A1* | 11/2017 | Gordon | G06F 3/017 |
| 2017/0339338 | A1* | 11/2017 | Gordon | G06K 9/00597 |
| 2018/0025743 | A1* | 1/2018 | Childress | G10L 25/63 |
| | | | | 704/205 |
| 2018/0053197 | A1* | 2/2018 | Chan | G06Q 30/0201 |
| 2018/0114124 | A1* | 4/2018 | Cronn | G06F 1/163 |
| 2019/0283257 | A1* | 9/2019 | Iyengar | G06N 5/022 |

* cited by examiner

EMOTIONALLY INTELLIGENT COMPANION DEVICE

FIELD OF INVENTION

The invention relates to a companion device. More particularly, the invention relates to a companion device which is emotionally intelligent and exhibits learning capacity. Further, the companion device is designed based on the affective loop principle.

BACKGROUND OF INVENTION

Recent years have seen numerous attempts by various scientists, for creation of robots which could understand the emotional state or affective state of the human and respond or react accordingly.

Many companies have developed a number of humanoids, such as Nadine, by the scientists at Nanyang Technological University, Singapore and Sophia by Hanson Robotics. Both Nadine and Sophia may be seen as attempts at developing such AI powered robots which could eventually provide childcare and offer friendship to lonely elderly people or which could perform other social functions, which may include teaching. Such robots are called as social robots or companion robots.

SoftBank's Pepper and Nao are other example of social robots or companion robots. For instance, Pepper is capable of identifying the principal human emotions which includes joy, sadness, anger or surprise. It is also capable of interpreting a smile, a frown tone of one's voice, as well as the lexical field one uses. It can also identify non-verbal language.

Few more examples of companion robots or social robots could be found in U.S. Pat. Nos. 6,175,772, 7,333,969, 8,909,370 and US2015/0012463.

The robot as described in U.S. Pat. No. 6,175,772 does responds to human emotions however, such a response is based on the discrepancy between the intention of the user while giving the command and the output obtained. The robot of US: 772 recognises this discrepancy by analysing the change in expressions on the face and/or in the voice. The robot is, however, not capable of analysing and responding according to the mood and/or personality of the person.

A better version for an apparatus for synthesizing human emotions is detailed in U.S. Pat. No. 7,333,969. The humanoid as disclosed in US: 969 expresses emotions based on the biological function of neurotransmitters such as norepinephrine and acetylcholine. The use of natural neurotransmitters makes the humanoid of the invention substantially costly to operate.

In addition to above inventors, numerous other inventors have been trying to develop such robots that could effectively interact with the human user by analysing the emotions of the human and respond accordingly.

In keeping with the above idea the current inventors now propose a robotic companion device or a companion device which could effectively act in accordance with the concept of Affective Loop and also provide a developmental boost to the user.

SUMMARY OF THE INVENTION

In an aspect, the invention provides a companion device which is designed to act based on the affective loop principle wherein the companion device is designed to capture and analyse the affective and semantic events and respond accordingly.

In an another aspect, the present invention provides a robotic companion device configured for capturing and analysing affective information and semantic information and elicit response accordingly.

In accordance with the invention the robotic companion device comprises a processor for managing emotional processing and responses configured for capturing and analysing semantic and affective information from sensory devices and communicating with users as well as external world using multitude of actuators and communication devices; a facial arrangement configured for capturing visual information and displaying emotions; a locomotor arrangement enabling movement of the robotic companion device; and microphone/speaker arrangement configured for receiving auditory signal and emitting vocal response. The facial arrangement the locomotor arrangement and the microphone/speaker arrangement are all in communication with the processor.

The companion device can learn about the personality of the user by monitoring the affective and semantic behaviour of the user over a period of time.

In an aspect, the invention provides a companion device which may act as a developmental companion for a user. Said companion device interacts with the user and learns about the user while interacting with the user.

The companion device of the invention can adapt an ideal personality based on the interactions the companion device has with the user over a period of time.

The companion device of the invention can undertake active and/or passive learning by receiving input from multitude of sensors or sensory devices which may form a single physical entity or the sensors may form an array.

DETAILED DESCRIPTION OF DRAWINGS

Figure 1A:
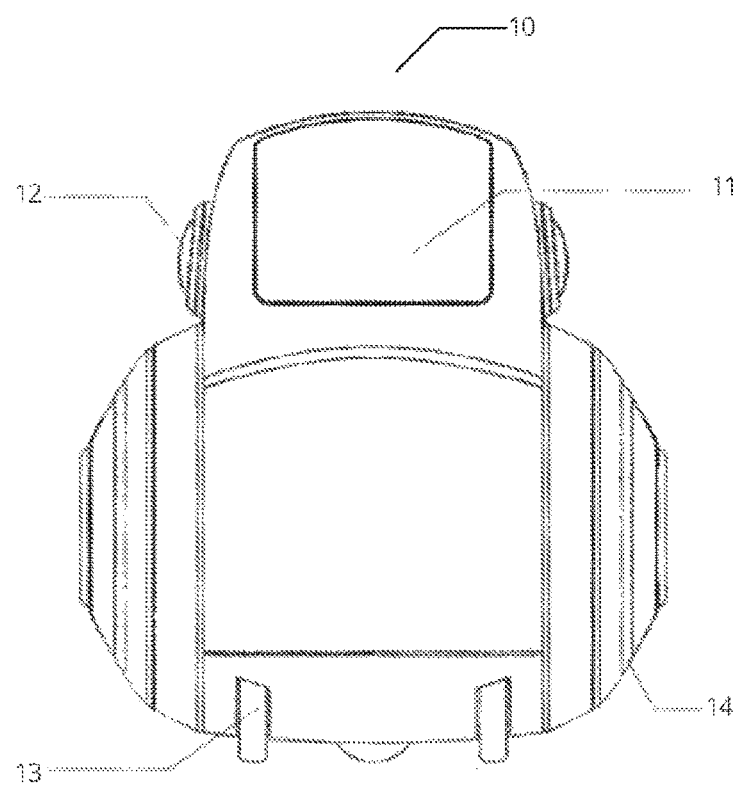
FIG. 1A illustrates the frontal view of the companion device in accordance with one of the embodiments.

The invention will now be described with reference to attached drawings.

Whereas the drawings demonstrate various embodiments of the same invention, they do not restrict the scope of the invention. Any modification in the embodiments of the instant invention may be viewed by the person ordinarily skilled in the art as falling within the ambit of the invention.

With reference to the drawings, the present invention discloses a robotic companion device (10) configured for capturing and analysing affective information and semantic information and elicits response accordingly. It comprises a processor (20) comprising an emotional core that manages emotional processing and responses configured for capturing and analysing semantic and affective information from sensory devices and communicating with users as well as external world using multitude of actuators and communication devices; a facial arrangement (11) in electronic communication with the processor (20), wherein the facial arrangement (11) is configured for capturing visual information and displaying emotions; a locomotor arrangement (13) in electronic communication with the processor (20), wherein the locomotor arrangement (13) enables movement of the robotic companion device (10) and a microphone/speaker arrangement (15) in electronic communication with the processor (20), wherein the microphone/speaker arrangement (15) is configured for receiving auditory signal and emitting vocal response.

Figure 1B:
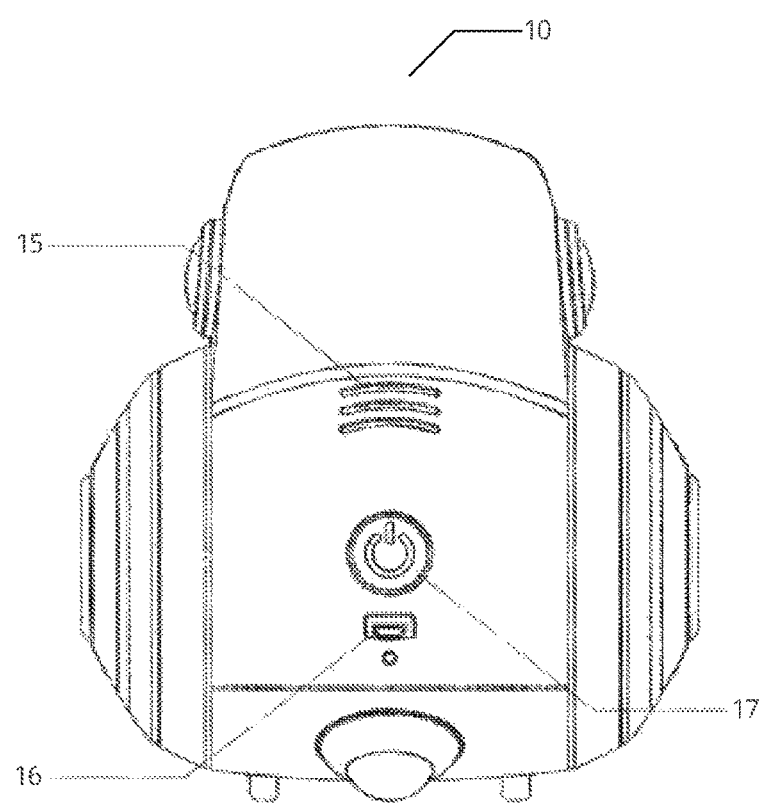
FIG. 1B illustrates the retral view of the companion device in accordance with one of the embodiments.

The attached FIG. 1A illustrates a frontal view of the companion device in accordance with one of the embodiments of the invention. The FIG. 1B illustrates the retral view of the companion device in accordance with one of the embodiments of the invention.

With reference to FIG. 1A, the frontal view of the companion device 10 exhibits three major parts, namely, a facial arrangement 11, ear lights 12, a locomotor arrangement 13 and side arm lights 14.

The facial arrangement 11 performs dual function of capturing visual information and displaying 'emotions_.

The facial arrangement 11 captures the semantic input such as face and affective input which may include facial expressions of the user. The facial arrangement 11 may also function in recognizing the user. The facial arrangement 11 may capture visual information through visual sensors selected from, but not limited to, cameras, 3D cameras 360 degree cameras, IR cameras, light field cameras, arrangement or array of cameras etc.

The facial arrangement 11 further comprises actuators like visual display elements which may include screen, light arrays for displaying a multitude of 'emotions_. Said 'emotions_ are displayed using a combination of actuators. For example the companion device can express anger using visual display of angry face using L E D lights and happiness using visual display of happy face and/or circular motion about its axis.

In an embodiment the visual sensor and/or actuators may comprise of an array of visual sensors and/or actuators dispersed across an area. Accordingly, the companion device may use sensory input from mobile devices like cameras and microphones as extension of its own visual and listening devices. For instance, when user is at home, the companion device can use sensors and actuators available at home, whereas while travelling the companion device can use the sensors and actuators available on mobile.

In one of the embodiments, the companion device may be adorned with such lights like ear lights 12 or side arm lights 14. Both the mentioned lights 12 and 14 are for decorative purposes and could be used for accentuating the affective responses of the companion device 10.

The companion device is further provided with the locomotor arrangement 13. Preferably, the locomotor arrangements are placed at the bottom of the body of companion device 10. Said locomotor arrangement 13 could be selected from but not limited to locomotion devices like wheel based drives, propulsion based flying devices, thruster based underwater units, manipulators like arms, legs, robotic tools and utilities, Preferably, the locomotor arrangement 13 is a two wheeled driver which enables the robotic companion 10 to move along any path in a two dimensional plane.

Now referring to FIG. 1B, which illustrates the retral view of the companion device 10, exhibits a microphone/speaker arrangement 15, a charging slot 16 and a power switch 17.

The microphone/speaker arrangement 15 preforms dual function of receiving auditory signal and emitting auditory response. The microphone/speaker arrangement 15 comprises of listening devices which may consists of single or an array of microphones etc. The microphone/speaker arrangement 15 further comprises of such arrangements or devices which are programmed to synthesize and emit voice.

The companion device is provided with a charging port 16 for charging the rechargeable power sources. The power source could be selected from batteries, solar cells etc. Preferably the power source is a rechargeable L i-ion battery.

Power switch 17 is provided for switching the companion device: on˘ or: off˘˘. Said power switch 17 could be a feather touch switch or push button switch or a button-type switch.

In addition to above mentioned sensors, the companion device may be equipped with multitude of encoders and sensors or sensory devices selected from, but not limited to, range and/or distance sensors, proximity sensors, location sensors inertial sensors and the like. The Range or Distance Sensors may include, but not limited to, ultrasonic sensors, Lidar, sonar etc. The proximity sensors may include, but not limited to, ultrasonic sensors, Infra-red sensors, NFC sensors, Bluetooth sensors. The location sensors may include, but not limited to RF Sensors, GPS sensors, geo location sensors etc. The inertial sensors may include, but not limited to, accelerometers, gyroscope, magnetometers, INS, temperature/pressure/light/humidity/wind speed etc.

The companion device may employ such other sensors or sensory devices which are relevant for the intended purpose of the companion device.

The abovementioned multitude of sensors or sensory devices may form a single physical system or may be distributed in form of network. For example, an array of cameras and listening devices may be spread throughout the house or office.

Figure 2:
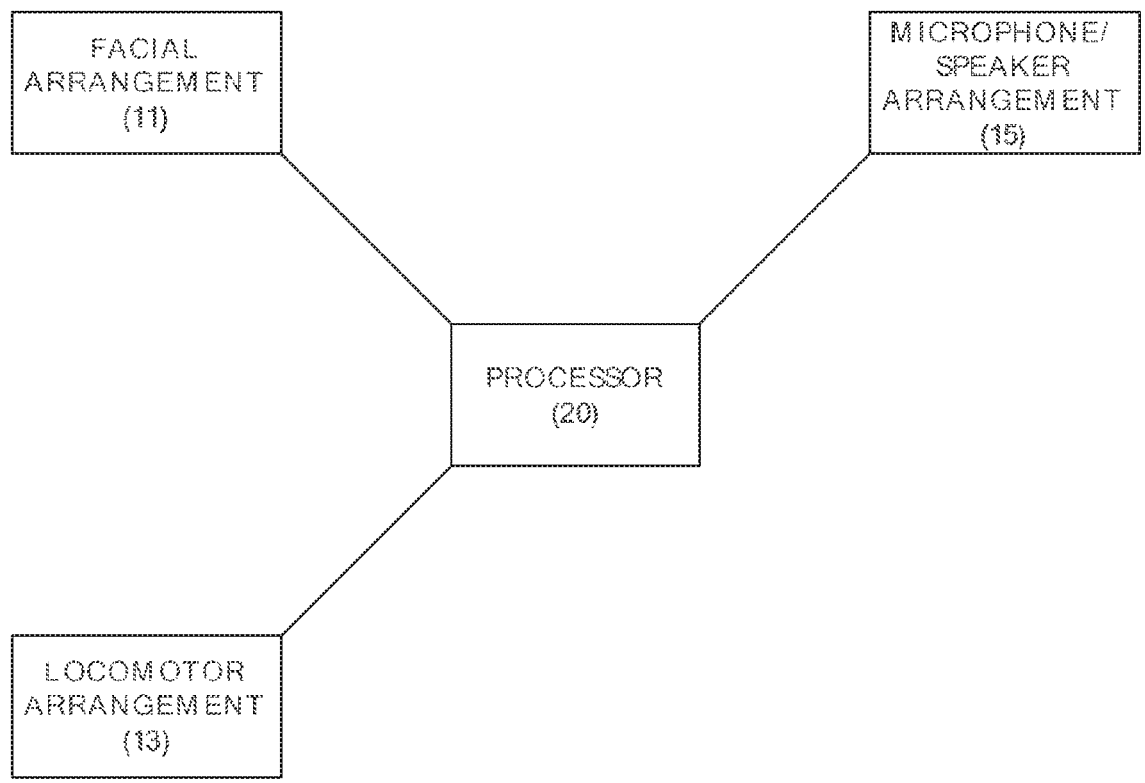
FIG. 2 illustrates a schematic diagram for the companion device 10 of the invention.

FIG. 2 illustrates a schematic diagram of the companion device of the invention. As illustrated therein, the facial arrangement 11, the locomotor arrangement 13 and the microphone/speaker arrangement 15 are in electronic contact with a processor 20.

The processor 20 receives the information from facial arrangement 11, through visual sensors, microphone/speaker arrangement 15 and such other sensors which may be incorporated in the companion device. The processor 20 analyses this information to determine the sematic and affective cues. The hence determined semantic and affective cues are then analysed simultaneously to determine the exact emotion expressed by the user.

The processor 20 then determines the response to be generated based on its analysis of the emotion expressed. The response hence generated could be a visual response which would be displayed by the facial arrangement 11 or an auditory response which may comprise of voice synthesis which would lead to emission of vocals through the microphone/speaker arrangement 15, or both.

In case of visual response the processor 20 may instruct the facial arrangement 11 to light-up the LEDs to form certain patterns which may indicate the desired response. For instance a smile may be displayed to indicate happiness. In case of vocal response the processor 20 may instruct the microphone/speaker arrangement 15 to synthesis and emit a vocal repose. For instance, the microphone/speaker arrangement 15 may emit a giggle like sound to accentuate the smile like visual response displayed on the facial arrangement 11.

In addition to responding to the input received through facial arrangement 11 and/or microphone/speaker arrangement 15, the processor 20 may also receive such other sensory information from other sensors which is necessary for performing other activities like unhindered locomotion by locomotor arrangement 13.

The act of receiving the sematic and affective input from the sensors, analysing the received input and responding in accordance with the received input could be termed as an event or an event of interaction.

Figure 3:
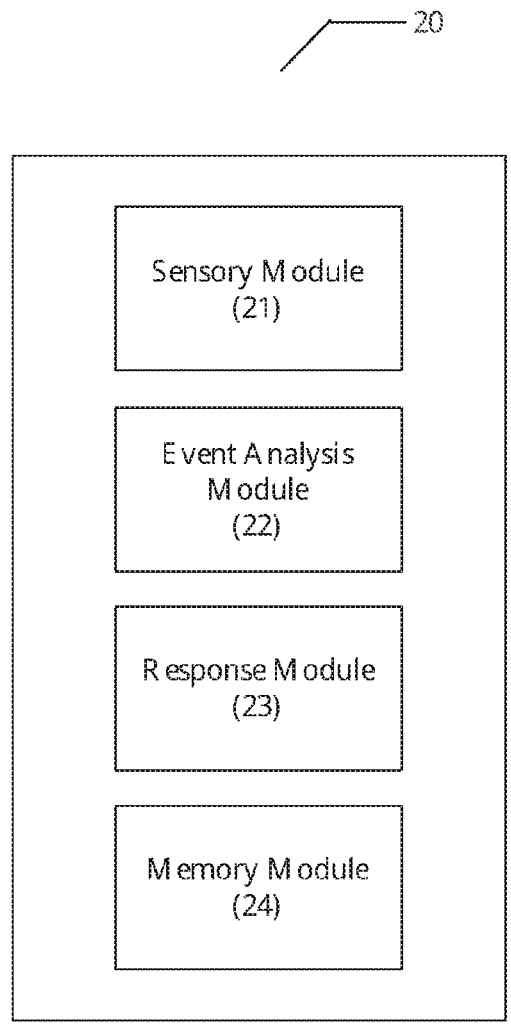
FIG. 3 illustrates a detailed schematic of the processor 20.

The attached FIG. 3 illustrates the schematic of the processor 20, detailing the modules which are incorporated in the processor.

The processor 20 is provided with a sensory module 21. The sensory module 21 is in direct electronic contact with all the sensors placed over the body of the companion device. The sensory module 21 may also be configured to receive sensory information from an array of sensors. The collected information may comprise of either semantic information or affective information or both. The received information is then passed by the sensory module 21 to an event analysis module 22.

The event analysis module 22 is configured to analyse the semantic and the affective input, either singly or simultaneously, as received from the sensory module 21, based on the analysis of the event the event analysis module 22 may generate a suitable semantic and/or affective response. Said semantic and/or affective response is then forwarded to a response module 23.

The response module 23 is in direct electronic contact with actuators which would generate the intended response. The response module 23 actuates the actuators placed in the facial arrangement 11, microphone/speaker arrangement 15 and locomotor arrangement 13, alongwith the actuators situated in the ear lights 12 and/or side arm lights 14 to generate the intended response as presented to it by the event analysis module 23.

The processor 20 is further provided with a memory module 24. The memory module 24 is configured to store all the events of interactions the companion device has with the user. It may further store information which may relate to specific circumstances which lead to occurrence of the event. The memory module 23 is configured to store the events which have occurred over a period of time. This stored information may be accessed by the event analysis module 22 as and when required to determine the ideal response to be generated when a certain event reoccurs.

The memory module 24 may also be configured to store such other information which may be acquired by the companion device while passively or actively interacting with the user. This information may also be accessed by the event analysis module 22 which may help the module 22 to adapt an ideal personality which is either supplementary or complementary to the personality of the user.

DETAILED DESCRIPTION OF INVENTION

The companion device of the invention is designed to function as a developmental companion that can help in social, academic and cognitive development of the user, especially children.

The companion device of the invention, as described herein, is designed to capture human emotions and respond accordingly. The companion device detects affective state of the human user by combining the inputs obtained from multitude of sensors. These inputs are used by the companion device to determine semantic and affective information either singularly or simultaneously. For instance, detection of face is semantic information and detecting the emotion emoted by the face is affective information Therefore, whether the face is smiling or frowning would form the affective information. In yet another illustration, the companion device processes the input from auditory sensors to determine the exact speech that has been uttered, this forms the sematic information. The companion device further analyses prosodic features of the hence detected speech such as pitch, tone and loudness, this forms the affective information.

The companion device of the invention is designed to function on the affective loop principle. Theoretically, affective loop may be defined as an act where 'the user of the system first expresses his emotions through some physical interaction involving his body, for example through gestures or manipulations; and the system then responds by generating affective expression, using for example, colours, animations, and haptics which in turn affects the user (mind and body) making the user respond and step-by-step feel more and more involved with the system_. In other words, affective loop could be defined as active interaction by the user in the form of active physical interaction. For the purpose of present invention, 'affective loop_ further comprises speech interaction, facial interactions and digital interaction via remote devices like mobile and passive interactions by observing users behaviour on various electronic and online footprint of the user.

In an embodiment, the companion device can also perform simultaneous processing of inputs from various sensors. Accordingly, facial information and speech information of the user conveyed by visual and audio sensors are processed simultaneously to determine the affective state of the user.

In an embodiment the companion device can not only analyse the semantic and affective information from the sensory inputs but also communicate with users and external world using multitude of actuators and communication devices.

The companion device requires actuators to express emotion. For example the companion device displays various pixel combinations to display emotions on visual display elements like screen or light arrays. A happy face displays a positive affective state and sad face denotes a negative affective state.

In an embodiment the companion device can be equipped with telecommunication devices like RF based telecommunication device, EM based telecommunication device, sound based telecommunication device, Internet satellite and/or mobile networks. The companion device can communicate using multiple telecommunication devices simultaneously. E specially catering to system where some elements of system are placed in remote locations.

The companion device may also be equipped with Bluetooth. The user can communicate with the robot using Bluetooth to send and receive data from the companion device.

In accordance with above embodiment, the companion device can use multiple communication devices simultaneously to transmit and receive information from multiple sources. For example it can use Bluetooth to communicate with the user on his mobile device while it can use Wi-Fi device to connect with the internet.

In an embodiment the companion device is designed to perform distributed processing. Accordingly, various components of companion device can be remotely located and perform like cohesive unit due to remote interaction capabilities of the companion device. For example the part of companion devices brain that is responsible for storing general knowledge information could be present on another companion device which is provided with superior hardware computing capabilities at a remote central location. Accordingly, this companion device can act as server which can be accessed by another companion device to access general knowledge information Furthermore, the companion devices can be considered as server which can be accessed by any other companion device or a part thereof to access general knowledge information. Thus multiple companion devices sharing a common processing routines or information database can be placed in central location and accessed using cloud based telecommunication devices. For example multiple companion devices at several user locations may be considered as sensors and actuator extension with its common brain present at a central location and communicate with each other using internet.

In accordance with above embodiment, as a consequence of being equipped with telecommunication devices, the companion device exhibits an ability to perform cloud based computations.

In another embodiment, the robotic companion not only captures affective response of user but it can also capture the internal emotional state of the user, which may be termed as 'internal world of user_. It does so by tracking the events that have led to occurrence of the affective response. For example while playing a game with the user, if the user losses the game and expresses sadness the companion devices associates sadness with the event of losing a game.

The robotic companion may further capture the state of 'external world of user_which may include external world events like sports, movies, news, traffic, travel, weather, festivals, celebrations location etc. For example the robotic companion may establish relationship of user emotions with external weather conditions, the robotic companion may record that the user is sad and it is cloudy weather or user is happy and its sunny weather outside or that the user is irritated as a result of very hot conditions.

Companion device can associate user's affective state by analysing the internal and external states simultaneously. For instance, the companion device can determine it is birthday and his parents are not at home so he is sad.

In an additional embodiment the robotic companion determines, whether its own actions have led to an affective response. The robotic companion captures the semantic information 'exact event_ during occurrence of effective state and also emotional information. While performing emotional processing not only affective information about events but semantic information is also tracked. The robotic companion may make a note of some specific sentences or events that make the user sad. Companion devices can record that user is tensed because he has exams tomorrow or user is sad as his favorite team has lost a game.

In further advantageous embodiment, the robotic companion captures the interpersonal interactions of multiple users. The companion device remembers users it has conversation with. It will not have a conversation on personal topics or provide details to stranger. Accordingly, the robotic companion may decide which or what information is to be revealed based on who is it interacting with. For instance if a stranger asks about the personal details of the user, like date of birth etc., it may not reveal any such information. It may not reveal to stranger its own personal details or obey commands from a stranger or set an alarm.

In an embodiment, the robotic companion may track semantic and affective responses over period of time ranging from few minutes to few months. The robotic companion may analyse patterns in sequence of occurrences to decipher short term and long term emotional states of user which include emotions, moods, sentiments and personality.

The affective states are broadly classified as emotions, moods, sentiments and personality. Emotions are short term affective state that occurs as a response to event from environment Moods are slightly long term affective state. Moods may be considered as long term manifestation of emotions. By observing events and emotions over period of months or years the robotic companion can determine the innate personality of user.

Accordingly, by analysing the events over short time, the robotic companion may determine what events have caused the emotional response. By observing the events and emotions of slightly longer duration of minutes to hours, the robotic companion may determine mood of the person. The robotic companion may observe the user behaviour over days and determine user sentiments what are his likes and dislikes by correlating the emotional response and events in different scenarios.

Users static sentiments remain fixed for relatively long duration of time ranging from days to months. As user evolves, his sentiments also charge and hence the way he reacts to various situations also changes. The robotic companion also keeps the track of said charge in user sentiments as he evolves over time. This tracking helps the robotic companion to determine the change in personality traits of the user. For instance, user may be introvert, but after some time he may start showing extrovert tendencies, the robotic companion can track this change and also determine if any specific event has led to this change. The robotic companion, over a period of interaction with the user, may determine the user personality type, as well.

In further embodiment the robotic companion of the invention may be designed for contextual understanding of the emotions and expressions. The contextual understanding of the emotions may be affected by analysing the semantic and affective information captured by all its sensors. This additional inference of the context provides the system with capability of inferring human intent interpersonal interaction.

In an embodiment the robotic companion maintains an internal state of its own emotions and affective states. The robotic companion comprises of an emotional core that manages emotional processing and responses. The internal state of the robotic companion stores its own semantic knowledge and emotions. It tracks what events have evoked a specific emotional state. For instance, if the robotic companion is dropped, it may become angry or if the user eludes to interact with it the robotic companion may become sad or uneasy and try to seek attention or if some disaster occurs it will express sadness. The robotic companion has its own likes, dislikes, preferences and opinions.

The robotic companion possesses a personality, which shapes how it responds to users or other systems in various scenarios and interpersonal interaction. The robotic companion does not simulate human emotions, but generates emotions as a response to various events in humans. In order to record and track affective states of the user and lean semantic information about user and external world the companion device is equipped with active and passive learning abilities.

Accordingly, in passive mode, it leans about the user by observing social media or other digital footprints of the user. During passive learning, the robotic companion does not interact directly with the user, but interacts with other third party systems which user uses. While in active learning the robotic companion may interact and engage the user using various modalities like talking, playing games and learn about the affective state and personalities.

The robotic companion may learn semantic as well as emotional information about the user. It may also learn about user, relationships, their likes and dislikes, daily lifestyle by asking the user directly or indirectly while conversing. It can learn various personality traits by observing how user reacts to various scenarios while playing games. The robotic companion continuously learns from the users and has personal database that stores all the semantic information like personal information, likes and dislikes, etc.

In another form of active learning the companion device learns about the external world. The companion device automatically scans and fetches information from the internet by accessing structured and unstructured information database, web sites etc. The companion device continuously keeps learning to increase and update its knowledge base. The knowledge consists of users, self and external world information.

In an embodiment, the companion device of the invention is designed to be situationally aware. The companion device is aware of social behavioural protocols. It follows these protocols while interacting with humans. For instance if the user is depressed the companion device will not provide him with negative response, even jokingly, as opposed to when user is in happy frame of mind. The companion device may further offer encouragement when the child loses a game or celebrates with the child when he/she wins a game or tell the child a joke when he/she is sad or tell the child a story when he/she is bored or play with the child to entertain it or get happy with the child when his/her favorite TV show is going to start, and the like. If a stranger asks companion device his personal details, it will not reveal it to stranger but will reveal it to its owner or master.

In an advantageous embodiment the companion device serves as an ideal companion for users with different personality types. The companion device learns about the user and semantic and affective history and adapts the most suitable personality.

Even though, all the companion devices may be personalized with respect to each user, all the data from multiple users will be aggregated to determine ideal companion personality traits for individual devices. This information will be used by the companion device to adaptively alter its semantic and affective responses to form ideal companion. Companion device has information about the cultural and personality preferences, based on which it determines how it should react in various inter personal situations. For example the companion device will not suggest a vegan user to try non vegetarian dish or express opinion that it likes non vegetarian dish if user is located in Indian sub-continent. While for a user located in Chinese region it will suggest trying sea food and would have like and disliking information about various sea food cuisines.

We claim:

1. A robotic companion device configured for capturing and analysing affective information and semantic information and elicit response accordingly comprising:
   a processor comprising an emotional core that manages emotional processing and responses, wherein the robotic companion device is configured with an active learning mode and a passive learning mode for
      learning semantic information and affective information about a user by combining one or more inputs from sensory devices, wherein the robotic companion device interacts with the user using one or more modalities during the active learning mode, and interacts with third systems used by the user during the passive learning mode, to learn about the user;
      determining an affective state of the user by analyzing the semantic information and the affective information of the user;
      associating the affective state of the user with an internal emotional state of the user and external world events by analyzing the internal emotional state of the user and the external world events, wherein the processor determines whether actions of the robotic companion device have led to the affective state of the user based on the semantic information and affective information of the user;
      classifying the affective state into at least one of emotions, moods, sentiments and personality by tracking the affective state of the user over a period of time; and
      generating and expressing emotions of the robotic companion device as a response based on the affective state of the user in association with the internal emotional state of the user and the external world events,
   wherein the robotic companion device is configured to infer human intent interpersonal interaction to respond in interpersonal interaction, based on understanding of context of emotions and expressions of the user, wherein the context of emotions and expressions of the user is determined based on the semantic information and the affective information of the user.

2. The robotic companion device of claim 1, wherein the emotional core further maintains affective states, semantic knowledge and emotions of the robotic companion device, wherein the robotic companion device tracks events that have evoked an affective state of the robotic companion device.

3. The robotic companion device of claim 1, wherein the robotic companion device comprises (i) a facial arrangement, in electronic communication with the processor, that is configured to capture visual information and display emotions, (ii) a locomotor arrangement, in electronic communication with the processor, that enables movement of the robotic companion device, and (iii) a microphone or speaker arrangement, in electronic communication with the processor, that is configured to receive auditory signal and emit vocal response.

4. The robotic companion device of claim 3, wherein the affective state of the user is determined by singularly or simultaneously processing facial information and speech information of the user conveyed by the visual sensors placed in the facial arrangement and auditory sensors in the microphone or speaker arrangement.

5. The robotic companion device of claim 1, wherein one or more components of a first robotic companion device are remotely distributed in one or more robotic companion devices which are accessed by the first robotic companion device via remote interaction.

6. The robotic companion device of claim 1, wherein the robotic companion device is configured to perform cloud based computations, wherein multiple robotic companion devices sharing a common processing routines or information database is placed in a central location and is accessed using the cloud based computations.

7. The robotic companion device of claim 1, wherein the robotic companion device has information about cultural and personality preferences, based on which the robotic companion device determines how to react in various inter personal situations, wherein data from multiple users are aggregated to determine ideal companion personality traits for individual robotic companion device and the data of multiple users is used by the robotic companion device to adaptively alter semantic and affective responses to form ideal companion.

8. The robotic companion device of claim 1, wherein the internal emotional state of the user is captured by tracking events that have led to occurrence of the affective state of the user.

9. The robotic companion device of claim 1, wherein the robotic companion device is configured to capture interpersonal interactions of multiple users and remember users who conversed with the robotic companion device.

10. The robotic companion device of claim 1, the passive learning mode comprises observing social media or other digital footprints of the user.

11. The robotic companion device of claim 1, wherein the active learning mode comprises interacting and engaging the user directly using various modalities like talking, playing games and learning about the affective state and personality of the user.

12. The robotic companion device of claim 11, wherein the active learning mode further comprises scanning and fetching information from the internet by accessing structured and unstructured information databases.

13. The robotic companion device of claim 1, wherein the robotic companion device is configured to be situationally aware and to follow social behavioural protocols while interacting with the user.

14. The robotic companion device of claim 1, wherein the external world of user comprises at least one of sports, movies, news, traffic, travel, weather, festivals, celebrations, or location, wherein the robotic companion device establishes relationship between the affective state of the user with the external world of user.

* * * * *